Figure 1:
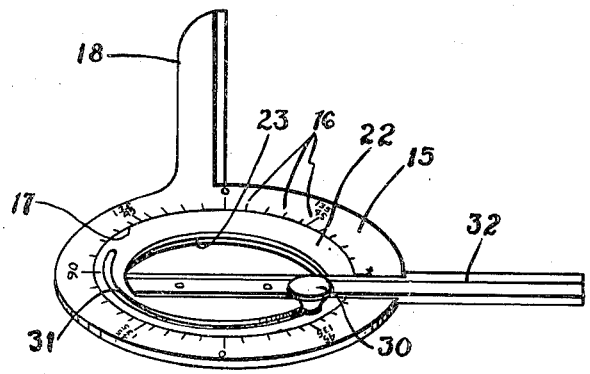

Sept. 6, 1949.  R. O. GALLINGTON ET AL  2,480,914
PROTRACTOR
Filed April 1, 1946  3 Sheets-Sheet 1

Inventors
Ralph O. Gallington
James M. Canaris

By Clarence A. O'Brien
and Harvey B. Jacobson
Attorneys

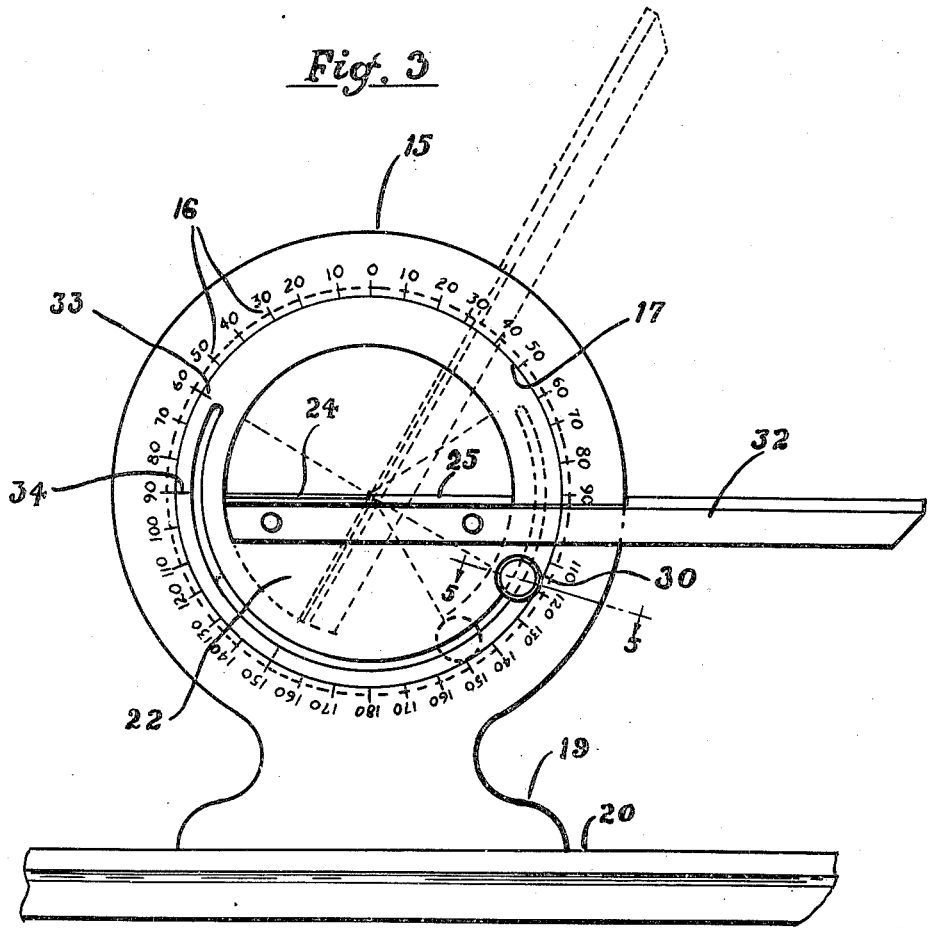

Sept. 6, 1949.  R. O. GALLINGTON ET AL  2,480,914
PROTRACTOR
Filed April 1, 1946  3 Sheets-Sheet 3

Inventors
Ralph O. Gallington
James M. Canaris

By Clarence A. O'Brien
and Harvey B. Jacobson
Attorneys

Patented Sept. 6, 1949

2,480,914

UNITED STATES PATENT OFFICE 2,480,914

PROTRACTOR

Ralph O. Gallington, College Park, Md., and James M. Canaris, Arlington, Va.

Application April 1, 1946, Serial No. 658,678

2 Claims. (Cl. 33—75)

1

This invention relates to a protractor and more particularly to a measuring instrument for use by draftsmen and those to whom angles are important.

The primary object of the invention is to establish an angle and then enable the angle so established to be moved to various angular positions for measuring and other purposes.

Another object is to enable the same index that is used to establish the initial angle, also to be used to determine other angles and their relation to the established angle.

The above and other objects may be attained by employing this invention which embodies among its features a frame having an annular row of graduations on at least one side face, a pair of superposed rings mounted in said frame to rotate about a common axis, each ring having a straight edge adapted when the rings are in a predetermined relative position to coincide and at least one index mark on each ring adapted to cooperate with the graduations on the frame.

Other features include means to lock the rings against relative rotation and a stop to limit relative movement of the rings in one direction when the straight edges thereof coincide.

Still other features include an arm extending radially from one of the rings with one edge coincidental with the straight edge of its respective ring, and a straight edge carried by the frame for cooperation with a straight edge employed on a drafting board when the device is being used as a drafting instrument.

Figure 2:
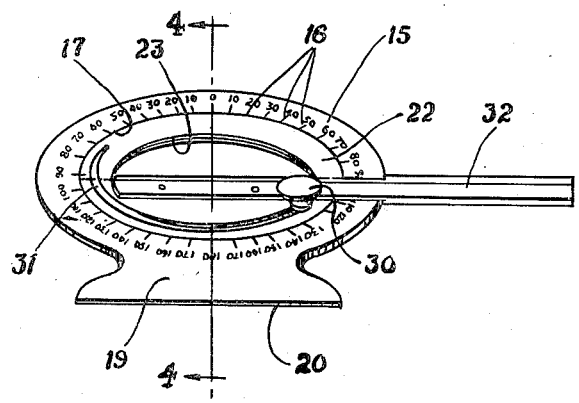
Figure 7:
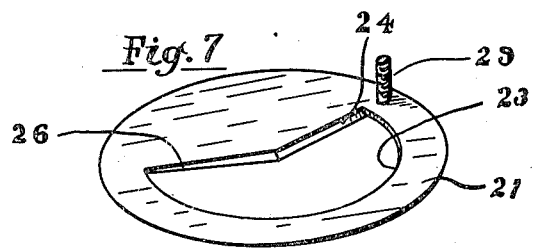
Figure 8:
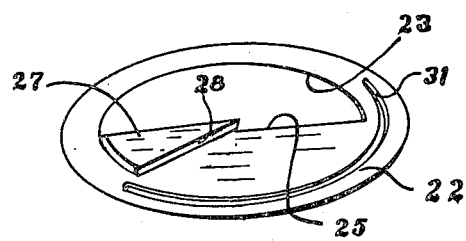
Figure 4:
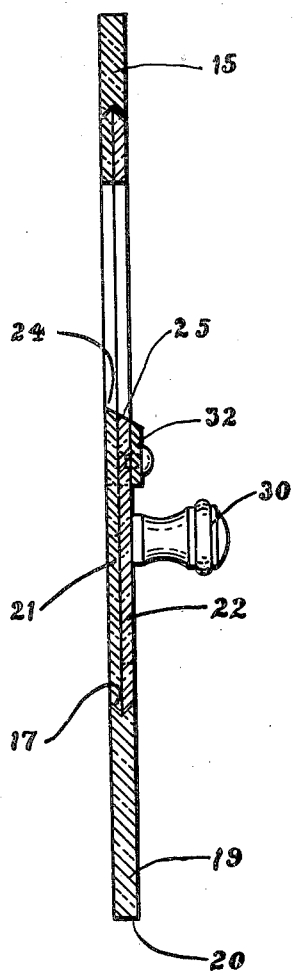
Figure 6:
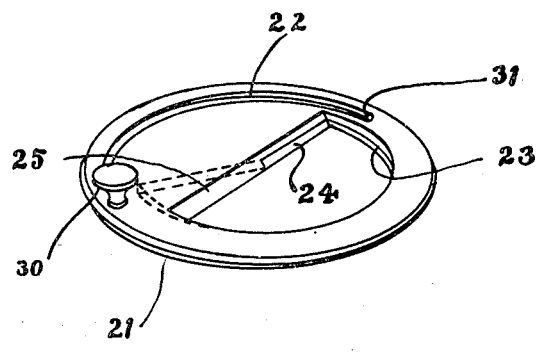

In the drawings,

Figure 1 is a perspective view of a protractor embodying the features of this invention illustrating the form adapted for use as a navigation instrument, Figure 2 is a perspective view of an improved protractor adapted for use as a drafting instrument, Figure 3 is a plan view of Figure 2 showing the device against the straight edge of a drafting board, Figure 4 is a sectional view taken substantially along the line 4—4 of Figure 2 on a greatly enlarged scale, Figure 5 is a fragmentary sectional view taken along the line 5—5 of Figure 3, Figure 6 is a perspective view of the rings assembled, Figure 7 is a perspective view of the bottom ring, and Figure 8 is a perspective view of the underside of the top ring.

2

Referring to the drawings in detail our improved protractor comprises a frame designated generally 15 which is provided on one face with an annular series of graduations 16 preferably divided into degrees and minutes, though only degrees is illustrated in the drawings. The frame 15 in the embodiment depicted is shown as being ring-shaped and is provided with an axial opening 17 the walls of which taper as illustrated in Figure 4 to form an annular groove or channel in which the superposed rings or plates to be more fully hereinafter described are mounted to rotate about a common axis. When the frame 15 is to be used as a navigation instrument it may be provided with a radially extending blade or arm 18 which aligns with the zero mark of the graduations 16 and when the instrument is to be used for drawing purposes it is preferably provided with a foot 19 having a straight edge 20 which lies perpendicular to the zero mark of the graduations 16. Mounted for rotation in the opening 17 of the frame 15 are superimposed plates or rings 21 and 22 each of which is provided with a substantially semi-circular opening 23 to form respectively on the rings straight edges 24 and 25. The straight edge 24 of the ring 21 extends inwardly to the axis of the ring and is joined at this point by an edge 26 forming a recess for the reception of a wedge-shaped stop 27 carried by the ring 22 the edge 28 of which is adapted to engage the edge 26 so as to hold the edges 24 and 25 in coincidental relation when the rings are in the position illustrated in Figure 6, to thus form a continuous straight edge extending diametrically across the assembly. Extending upwardly from the upper face of the ring 21 is a screw-threaded stud 29 onto which a nut 30 is adapted to be fitted. An arcuate slot 31 is formed in the superposed ring 22 for the reception of the stud 29 so that when the nut 30 is tightened on the stud the rings 21 and 22 will be held against relative rotation. An arm or blade 32 is preferably attached to the upper face of the ring 22 with one edge coincidental with the straight edge 25 thereof, and this arm extends radially across the outer face of the frame 15 as illustrated in Figures 1, 2 and 3 for cooperation with the graduations 16 on the frame.

Formed on the inner face of the ring 21 is an index mark 33 which is adapted to cooperate with the graduations 16, and aligns with the straight edge 24 thereof. A similar graduation mark 34 is formed on the outer face of the ring 22 in alignment with the straight edge 25 for cooperation with the graduations 16 on the frame 15. The rings or plates 21 and 22 are preferably formed of a transparent material such as Celluloid or like plastics, commonly found on the market.

In use it will be understood that by moving the ring 21 relative to the ring 22 the straight edges 24 and 25 will be disposed at an angle with relation to one another. By holding the blade 32 in a fixed position with relation to one of the graduations 16 and moving the ring 21 the index 33 may be moved to establish a definite angle between the two straight edges 24 and 25. The thumb nut 30 may then be tightened, and upon moving the arm 32 the two rings 21 and 22 will be moved as a unit so as to enable the established angle to take various angular positions about the axis of the device. When it is desired to return the straight edges 24 and 25 into coincidental relation the thumb nut 30 is released and the stop 27 is moved so that its face 28 engages the face 26 of the ring 21 after which the thumb nut 30 may be tightened.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

1. A protractor comprising a frame having a circular opening therein and the wall of the opening having a V-shaped annular groove extending therearound, a pair of superposed circular transparent plates having oppositely bevelled peripheral edges mounted in the circular opening in the frame for rotation about the axis of the opening, an annular row of graduations on the frame concentric about the circular opening therein, an index mark on each plate for cooperation with the annular row of graduations, each plate having an opening therein, one wall of which lies radial to the center about which the plates rotate and forms a straight edge on its respective plate, one of said plates having an arcuate slot extending therethrough concentric with the edge thereof, a threaded stud carried by the opposite plate and extending through the slot and a nut threadedly engaging the stud for engaging the slotted plate and locking said plates together for unitary rotation in the frame.

2. A protractor comprising a frame having a circular opening therein and the wall of the opening having a V-shaped annular groove extending therearound, a pair of superposed circular transparent plates having oppositely bevelled peripheral edges mounted in the circular opening in the frame for rotation about the axis of the opening, an annular row of graduations on the frame concentric about the circular opening therein, an index mark on each plate for cooperation with the annular row of graduations, each plate having an opening therein, one wall of which lies radial to the center about which the plates rotate and forms a straight edge on its respective plate, one of said plates having an arcuate slot extending therethrough concentric with the edge thereof, a threaded stud carried by the opposite plate and extending through the slot and a nut threadedly engaging the stud for engaging the slotted plate and locking said plates together for unitary rotation in the frame, and a wedge-shaped stop on the opposite plate for engagement in the opening provided in the other plate to arrest relative movement of the plates when the radial straight edges thereof coincide.

RALPH O. GALLINGTON.
JAMES M. CANARIS.

REFERENCES CITED

The following references are of record in the file of this patent:

UNITED STATES PATENTS

| Number | Name | Date |
| --- | --- | --- |
| 367,673 | Shaw | Aug. 2, 1887 |
| 641,486 | Ahlstrand | Jan. 16, 1900 |
| 781,737 | Pauli | Feb. 7, 1905 |
| 923,313 | Anderson | June 1, 1909 |
| 1,661,095 | Rowe | Feb. 28, 1928 |

FOREIGN PATENTS

| Number | Country | Date |
| --- | --- | --- |
| 4,530 | Great Britain | 1885 |